United States Patent [19]

Kobayashi

[11] Patent Number: 4,662,235
[45] Date of Patent: May 5, 1987

[54] REVERSE CHECK MECHANISM FOR A TRANSMISSION IN A MOTOR VEHICLE

[75] Inventor: Toshio Kobayashi, Tokyo, Japan

[73] Assignee: Fuji Jukogyo Kabushiki Kaisha, Tokyo, Japan

[21] Appl. No.: 747,505

[22] Filed: Jun. 21, 1985

[30] Foreign Application Priority Data

Jul. 9, 1984 [JP] Japan .................. 59-141757

[51] Int. Cl.⁴ ............................................. F16H 57/06
[52] U.S. Cl. ...................................................... 74/476
[58] Field of Search .......................................... 74/476

[56] References Cited

U.S. PATENT DOCUMENTS 3,933,057  1/1976  Tsuzuki et al. ...................... 74/476
4,476,740 10/1984  Ida et al. ............................ 74/476

FOREIGN PATENT DOCUMENTS 54-23060  8/1979  Japan .
56-24259  3/1981  Japan ..................................... 74/476

Primary Examiner—Allan D. Herrmann
Attorney, Agent, or Firm—Martin A. Farber

[57] ABSTRACT

A reverse check mechanism for preventing a shift lever from moving from a fifth gear position to a reverse gear position. The mechanism has a slidable shaft and a slidable and rotatable cam. The slidable shaft and cam have engaging portions which engage with an arm when the shift lever is shifted to the neutral position between both the gear positions, and the cam has a recess having an edge adapted to engage with the arm. The cam is stopped from rotating to the reverse gear position from the neutral position. The recess of the cam is so arranged that when the shift lever is shifted to the fifth gear position, the arm corresponds to the recess, so that the cam is moved by a spring so as to engage the edge of the recess with the arm, whereby the movement of the arm from the neutral position to the reverse gear position is prevented.

6 Claims, 15 Drawing Figures

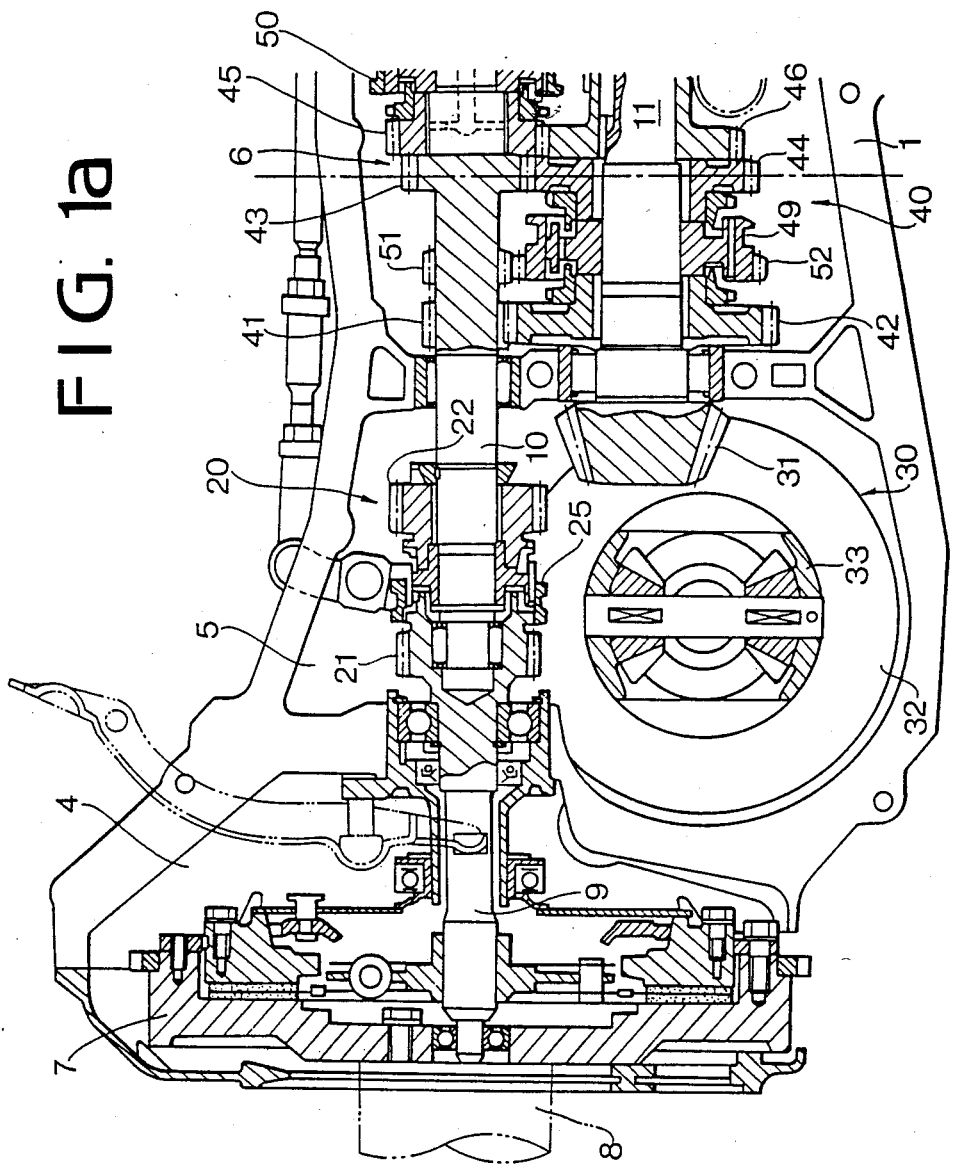

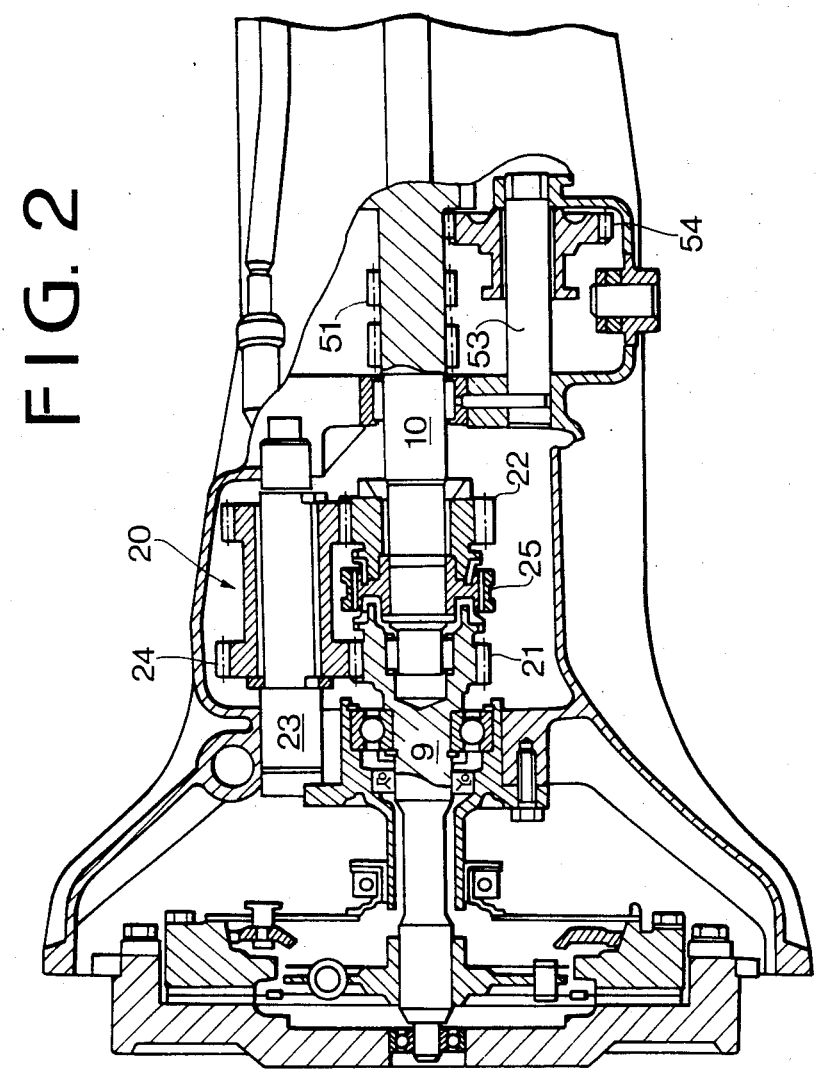

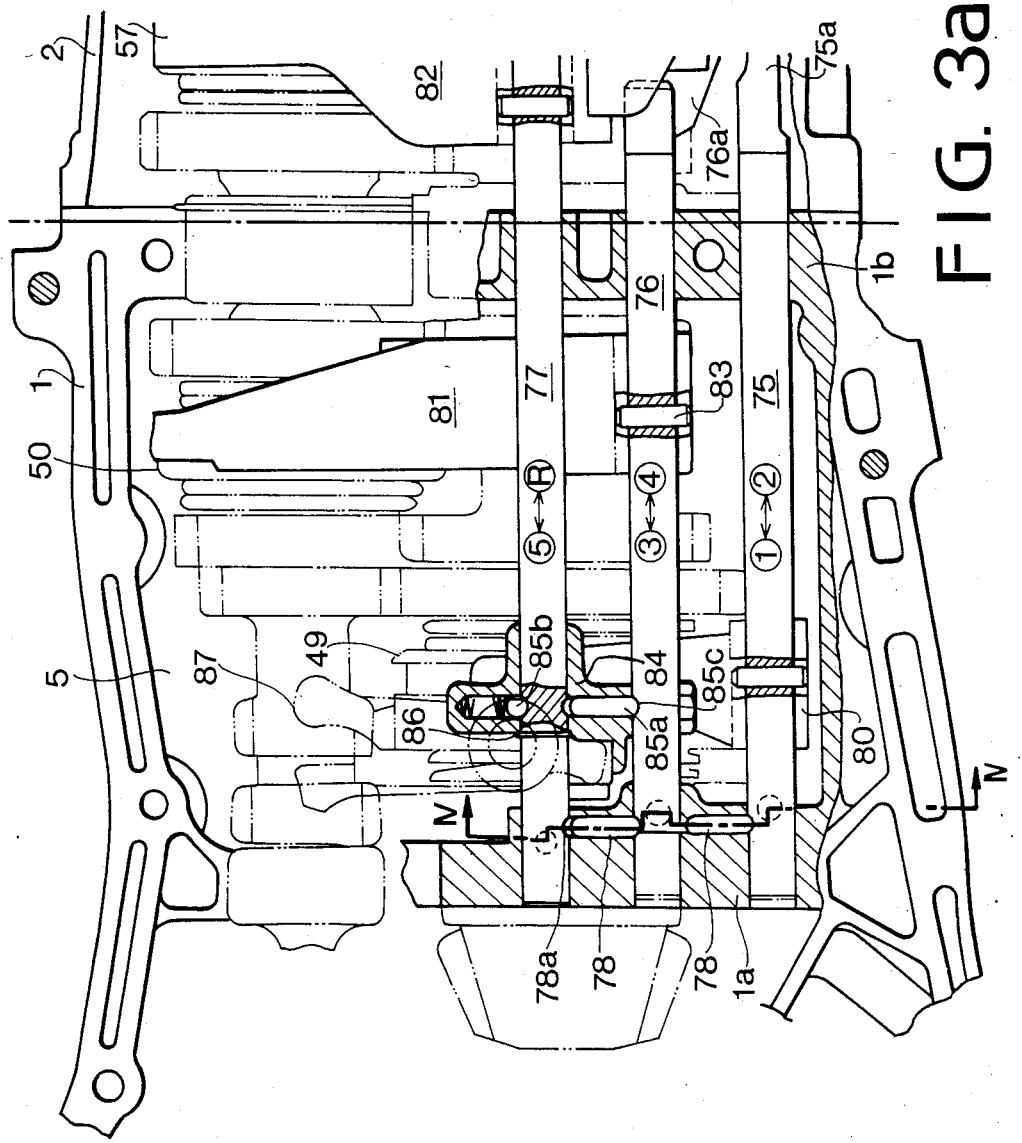

REVERSE CHECK MECHANISM FOR A TRANSMISSION IN A MOTOR VEHICLE

BACKGROUND OF THE INVENTION

The present invention relates to a mechanism for checking the shifting of a shift lever of a transmission from one of change-speed gear positions to a reverse position.

In a five-speed transmission for a motor vehicle, a shift lever is shifted on a straight line, passing through the neutral position, in order to select a fifth speed gear and a reverse gear. In such a system, a reverse check mechanism is provided in order to prevent the shift lever from moving to the reverse position over the neutral position from the fifth position.

Japanese Patent Publication 54-23060 discloses a reverse check mechanism comprising a slidable shaft, stopper, and spring, one end of which is connected to a transmission case. Since the mechanism is not independent from the transmission case, the work for attaching the mechanism and adjusting of the mechanism are complicated, reducing workability and productivity of the mechanism.

SUMMARY OF THE INVENTION

The object of the present invention is to provide a reverse check mechanism which has an independent structure from a transmission case, whereby the attachment and adjustment of the mechanism can be easily done.

In accordance with the present invention, the reverse check mechanism comprises an arm operatively connected to a shift lever, a cylindrical holder secured to a case for the transmission, a slidable shaft slidably provided in the holder, and a cam slidably and rotatably mounted on an end portion of the slidable shaft. The slidable shaft and cam have engaging portions which engage with an end of the arm when the shift lever is shifted to the neutral position between the fifth gear position and the reverse gear position, so that the shaft and cam are moved to the neutral position. The cam further has a recess having an edge adapted to engage with an end of the arm. A first spring is provided for urging the shaft in an axial direction and a second spring is provided for urging the cam in the same direction as the first spring and in a circumferential direction. A stopping means, comprising a projection on an end of the cam and an opening in a spring retainer engaging with the projection, is provided for stopping the cam from rotating to the reverse gear position from the neutral position. The recess of the cam is so arranged that when the shift lever is shifted to the fifth gear position, an end portion of the arm corresponds to the recess, so that the cam is axially moved by the second spring so as to engage the edge of the recess with the end portion of the arm, whereby the movement of the arm from the neutral position to the reverse gear position is prevented by the checking of the cam caused by the stopping means.

The other objects and features of this invention will be apparently understood from the following description with reference to the accompanying drawings.

BRIEF DESCRIPTION OF THE DRAWINGS

FIGS. 1a and 1b are longitudinal sectional views showing a transmission for a four-wheel drive motor vehicle, to which the present invention is applied;

FIG. 2 is a horizontal sectional view of a part of the transmission of FIG. 1a;

FIGS. 3a and 3b are a sectional views of an embodiment of the present invention;

FIG. 3c shows a shift pattern:

FIG. 4 is a sectional view taken along the line IV—IV of FIG. 3a;

DETAILED DESCRIPTION OF THE PREFERRED EMBODIMENT

Figure 1B:
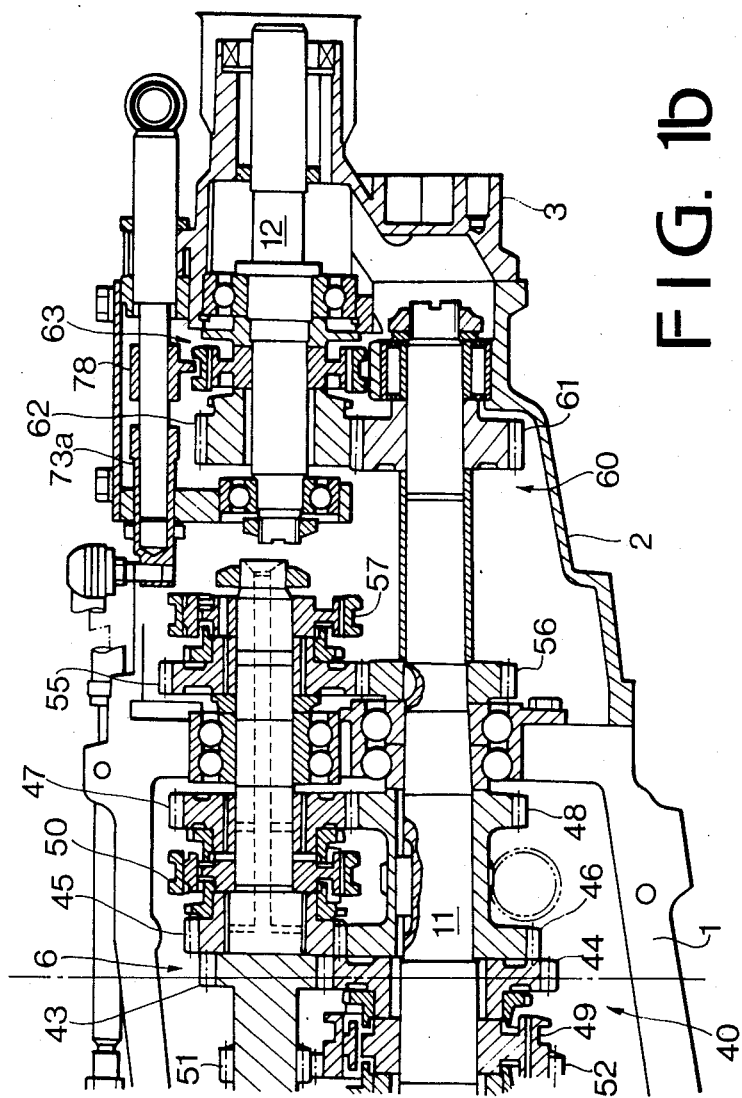
Figures 3B, 3C:
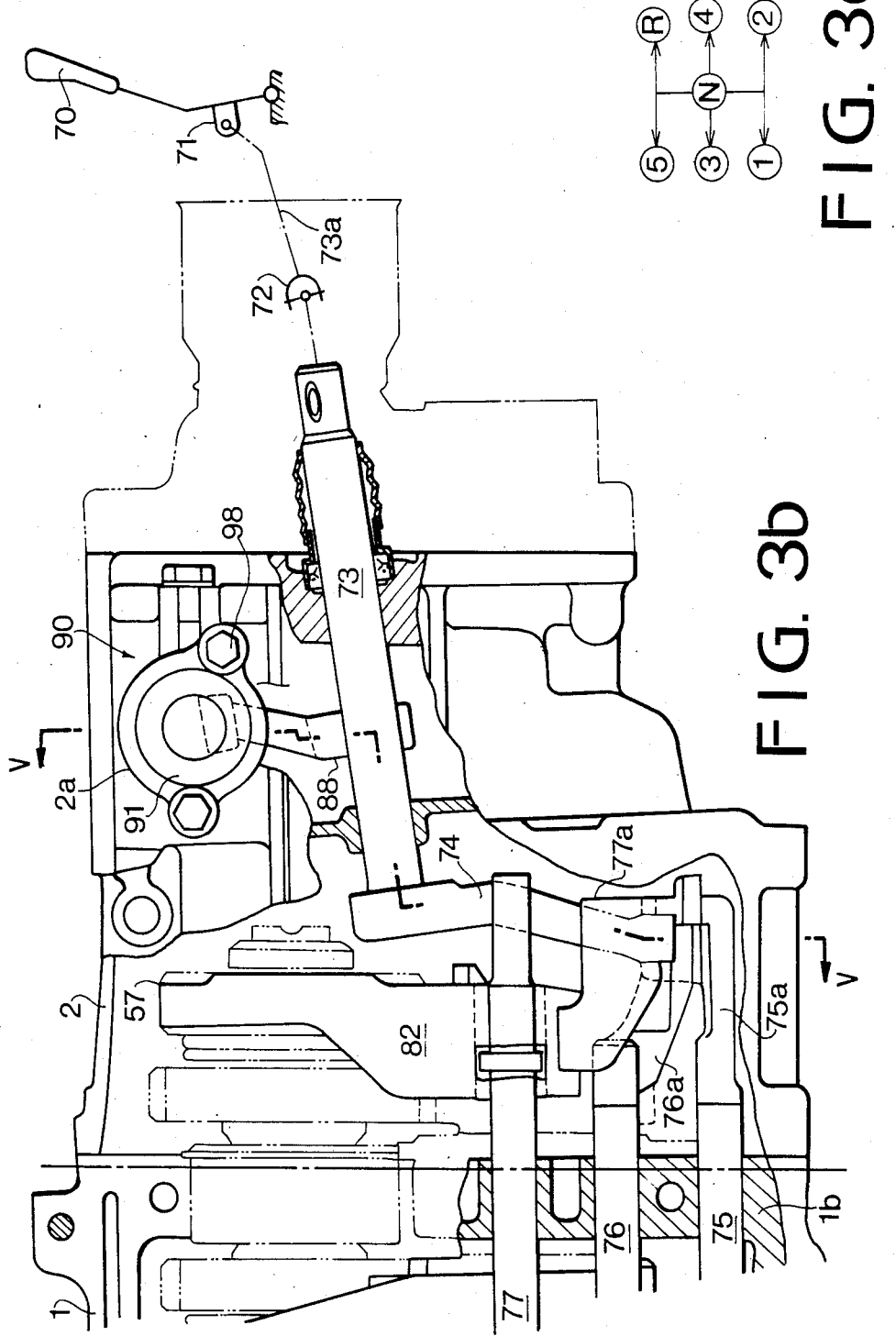

Referring now to the drawings, and more particularly to FIGS. 1a, 1b and 2, there is illustrated a longitudinally disposed trans-axle type transmission for a four-wheel drive motor. The transmission comprises a transmission case 1, a transfer case 2 secured to the case 1 at the rear end thereof, and an extension case 3 secured to the case 2. The transmission case 1 comprises a pair of longitudinally divided shells and the inside thereof is divided to three compartments 4 to 6. A clutch 7 is provided in the forward compartment 4, and a sub-transmission 20 and a front differential 30 are arranged in the middle compartment 5. A main transmission 40 is provided in the compartment 6 and case 2, and a transfer device 60 is disposed in the case 2. In the driving system, a crank shaft 8 of an engine (not shown) is operatively connected to an end of an input shaft 9 through the clutch 7 and the sub-transmission 20 is disposed between the input shaft 9 and a main drive shaft 10 of the main transmission 40.

The sub-transmission 20 comprises a high speed gear 21 formed on the input shaft 9, a low speed gear 22 rotatably mounted on the main drive shaft 10 in alignment with the shaft 9, counter gears 24 and 24a (FIG. 2) rotatably mounted on a counter shaft 23, and engaged with both gears 21 and 22, and a synchronizer 25 as a clutch disposed between the high speed gear 21 and the low speed gear 22 on the main drive shaft 10. As shown in FIG. 1a, when the synchronizer 25 is engaged with the high speed gear 21, the shaft 9 is directly coupled to the shaft 10 to provide a higher speed drive range, and, on the contrary, when the synchronizer is engaged with the low speed gear 22, the gear 21 is connected to the shaft 10 through gears 24, 24a and 22 to provide a lower speed drive range. The main transmission 40 is a five-speed transmission with overdrive, in which an output shaft 11 is arranged below the drive shaft 10 in parallel with it. First gears 41 and 42, second gears 43 and 44, third gears 45 and 46, fourth gears 47 and 48 are provided on both shafts 10 and 11. The first and second driven gears 42 and 44 are rotatably mounted on the output shaft 11 and a synchronizer 49 is disposed between the driven gears. The third and fourth drive gears 45 and 47 are rotatably mounted on the main drive shaft 10 and a synchronizer 50 is disposed between the drive gears. For reverse driving, an idler gear 54 is slidably mounted on a shaft 53 as shown in FIG. 2, and adapted to be engaged with a drive gear 51 on the drive shaft 10 and with a driven gear 52 on the sleeve of the synchronizer 49. In addition, the main transmission 40 has fifth speed gears 55 and 56 between the main drive shaft 10 and the output shaft 11, and a synchronizer 57 arranged between the rotatably drive gear 55 and the shaft 10. A drive pinion 31 is formed at the front end of the shaft 11 and engaged with a crown gear 32 of a front differential 30, and a differential gear device 33 of the front differential 30 is coupled to front wheels of the vehicle.

In the transfer device 60, a transfer drive gear 61 securely mounted on the output shaft 11 is engaged with a driven gear 62 rotatably mounted on a rear drive shaft 12 and a transfer clutch 63 in the form of a synchronizer is disposed between the gear 62 and the shaft 12.

Referring to FIGS. 3a, 3b, 3c, 4 and 5, a gear shift lever 70 is pivotally supported at the lower end thereof and operatively connected to a rear end portion of a shifter rod 73 through a universal joint 72, rod 73a, and joint 71 provided on the shift lever 70. A shifter arm 74 is secured to the front end of the shifter rod 73. In the transmission case 1, a first-and-second shifter rail 75, a third-and-fourth shifter rail 76, and a fifth-and-reverse shifter rail 77 are disposed in parallel with each other and slidably supported by partitions 1a and 1b. A rear portion of each shifter rail projects rearwardly from the partition 1b into the transfer case 2. Engaging arms 75a to 77a are provided on rear ends of the shifter rails 75 to 77, in order that the lower end of the shifter arm 73 selectively engages with one of engaging forks 75b to 77b formed in the arms.

Figure 4:
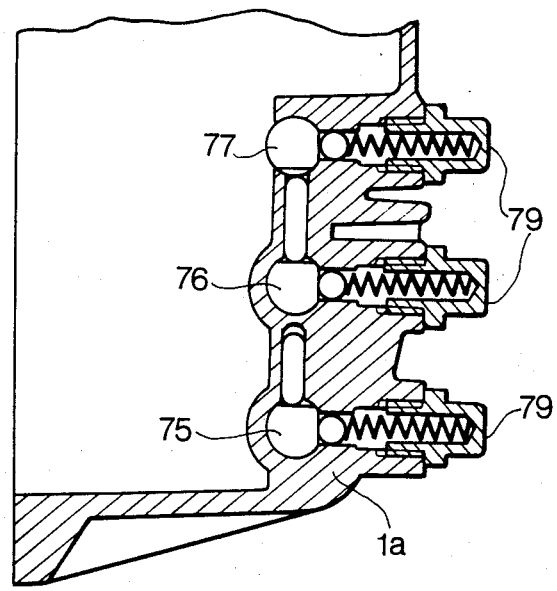

In the partition 1a, interlock pins 78 are slidably provided between the shifter rails 75 to 77. Each of the interlock pins engages with one of notches 78a formed in the shifter rails at one end thereof so as to prevent movements of two or three rails at the same time. Further, as shown in FIG. 4, spring-loaded lock balls 79 are provided to position the shifter rails 75 to 77. Forks 80, 81, and 82 are secured to the shifter rails 75 to 77 by pins 83 and engage with sleeves of the synchronizers 49, 50 and 57. A reverse shifter arm 84 is slidably mounted on the shifter rail 77 and positioned by a spring loaded lock ball 85b. An interlock pin 85a is slidably provided in the reverse shifter arm 84 so as to engage with a notch 85c of the shifter rail 77 or 76 dependent on the operation. A snap ring 86 is secured on the shift rail at the left side of the reverse shifter arm 84 so as to shift the arm to the right, in FIG. 3. The reverse shifter arm 84 is operatively connected to the idler gear 54 through an inverting lever 87. Further, an arm 88 for a reverse check mechanism 90 is secured to the shift rod 73.

Figure 6:
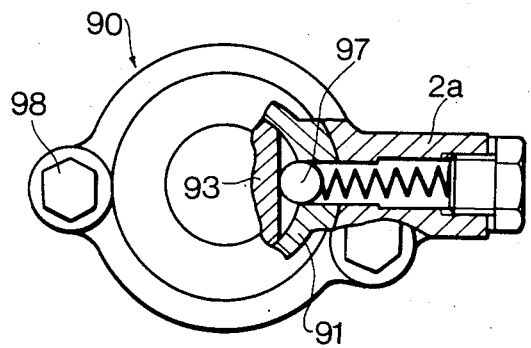
FIG. 6 is a partial sectional view of a reverse check mechanism of the present invention.
Figure 7:
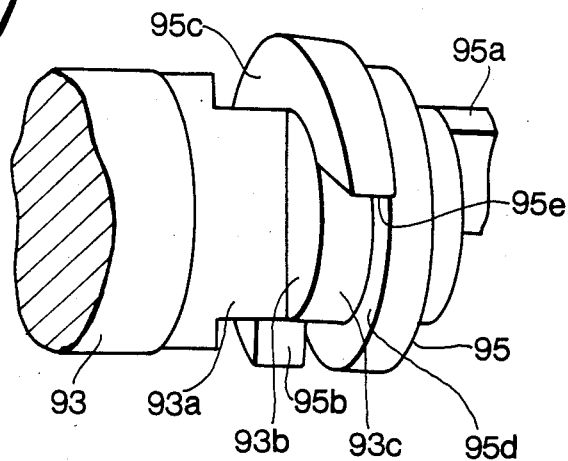
FIG. 7 is a perspective view of a cam.
Figure 8:
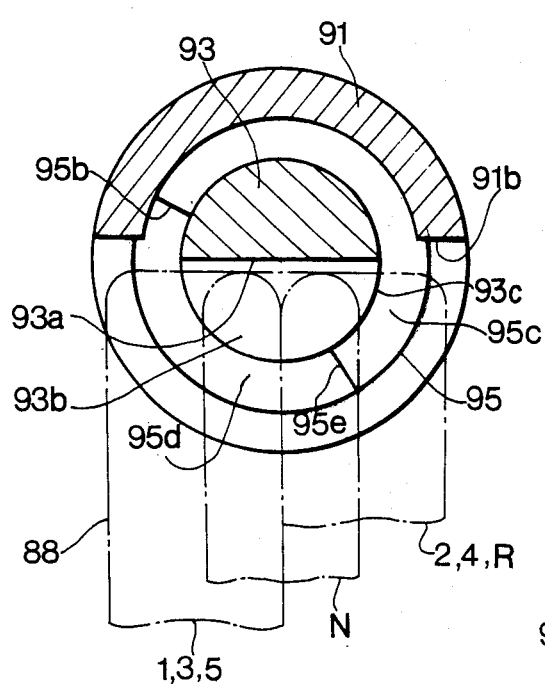
FIG. 8 is a sectional view taken along the line VIII—VIII of FIG. 5.
Figure 9:
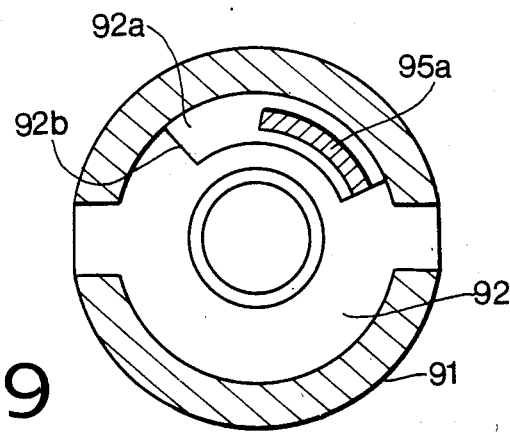
FIG. 9 is a sectional view taken along the line IX—IX of FIG. 5.

Referring to FIGS. 5 to 9, the reverse check mechanism 90 comprises a cylindrical holder 91 engaged with a receiving portion 2a formed on the transfer case 2 and secured by bolts 98, and an axially slidable shaft 93 slidably engaged in the holder 91 and urged to the left (FIG. 5) by a spring 94 provided between the shaft 93 and a spring retainer 92. The axis of the shaft 93 is at a right angle with the axial moving direction of the rod 73 for engaging gears. A cylindrical cam 95 is slidably and rotatably provided in the space between the inner wall of the holder 91 and a reduced diameter portion 93c of the shaft 93. The cam 95 is urged by a spring 96 to the left (FIG. 5) against a shoulder 91a and urged in the clockwise direction in FIG. 9 to engage a projection 95a at the rear end of the cam with an end wall of an arcuate opening 92a formed in the spring retainer 92 (FIG. 9). The holder 91 has an opening 91b at an underside portion thereof, and a laterally extending groove 93a is formed in the shaft 93 at a portion corresponding to the opening 91b. On the other hand, the cam 95 has a recess 95b at the periphery thereof within an angular range corresponding to a half of the angular range of the groove 93a. As shown in FIG. 7, a side 95c of the cam 95 is flush with an inside 93b of the groove 93a, before the shaft 93 is shifted, and when the shaft 93 is shifted, the inside 93b becomes flush with a side 95d of the cam 95. As shown in FIG. 6, a spring-loaded ball lock mechanism 97 is provided to hold the shaft 93 at the position of FIG. 5.

On the other hand, the end of the arm 88 is inserted into the groove 93a passing through the opening 91b of the holder 91.

Figure 5:
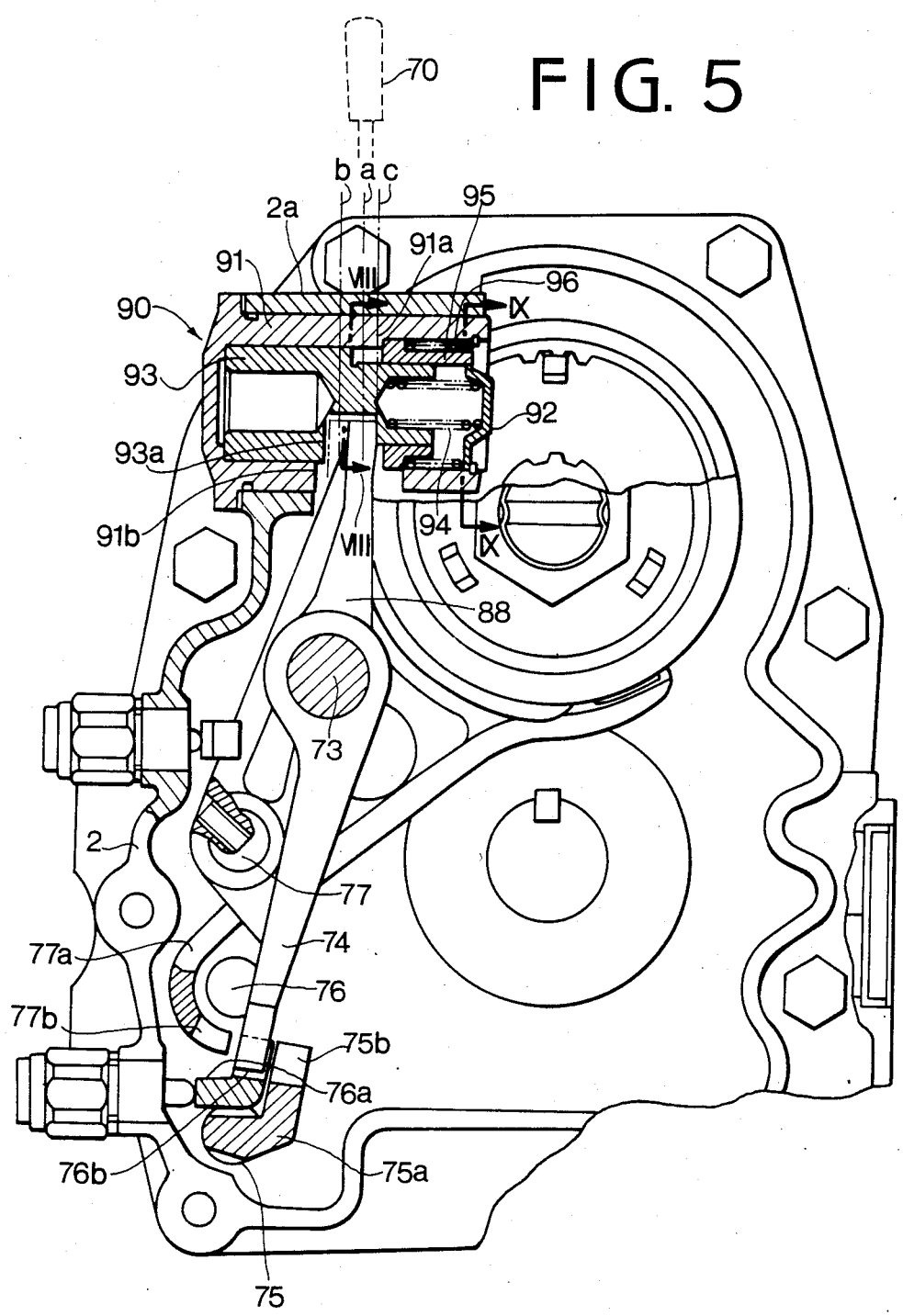
FIG. 5 is a sectional view taken along the line V—V of FIG. 3b.

In operation, when the shift lever 70 is shifted to the left position b in FIG. 5, the shifter arm 74 rotates in the counterclockwise direction, so that the lower end of the arm engages with the fork 75b of the first-and-second shifter rail 75. Accordingly, when the shift lever 70 is shifted forwardly or backwardly, the fork 80 moves in the axial direction to shift the sleeve of the synchronizer 49 to engage the first gear 42 or second gear 44 with the output shaft 11. When the shift lever 70 at the middle position a is shifted, the shifter arm 74 engages with the fork 76b of the third-and-fourth shifter rail 76. Accordingly, the synchronizer 50 is operated by the fork 81 to select the third speed or fourth speed.

When the shift lever 70 is shifted to the right position c, the shifter arm 74 engages with the fork 77b of the shifter rail 77. When the shift lever 70 is forwardly shifted to the fifth speed position, the shifter rail 77 is forwardly moved to move the fork 82 to operate the synchronizer 57, causing the gear 55 to engage with the shaft 10 to select the fifth speed. On the when contrary, the shift lever 70 is backwardly shifted, the snap ring 86 on the shifter rail 77 engages with the shifter arm 84 to move it backwardly, causing the lever 87 to move to engage the idler gear 54 with gears 51 and 52. Thus, the reverse gear is selected.

Figure 10A:
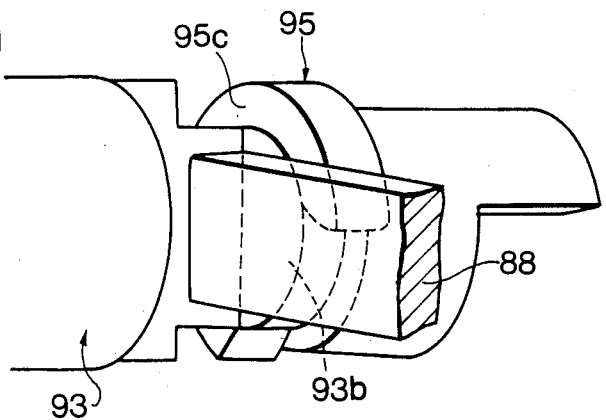
FIGS. 10a to 10c are perspective views showing the operation of the mechanism.
Figure 10B:
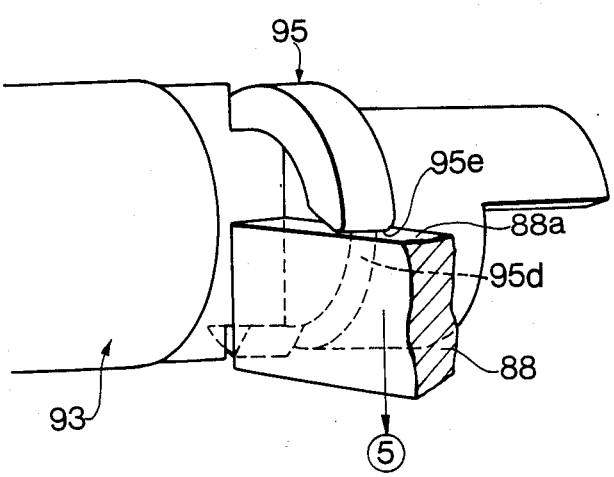
Figure 10C:
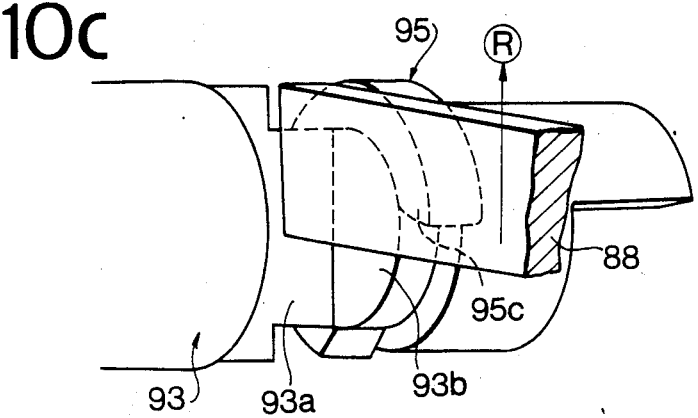

Explaining the operation of the reverse check mechanism 90 with reference to FIGS. 10a to 10c, when the shift lever 70 is shifted to the right position c, the right side of the arm 88 engages with the side 93b of the shaft 93 and with side 95c of the cam 95 and pushes both the sides to the right, so that the shaft 93 and cam 95 are moved to the right against the springs 94 and 96. At that time, the ball lock mechanism 97 releases the shaft 93. When the shift lever 70 is shifted to the fifth speed position (FIG. 10b), a side 88a of the arm 88 passes an edge 95e of the cam 95 and the arm 88 corresponds to the recess 95b, so that the cam 95 is moved to the left, that is the middle position a by the spring 96, as shown in FIG. 10b. When the shift lever 70 is shifted towards the neutral position in order to disengage the fifth gear 55, the side 88a of the arm 88 pushes the cam 95 in the counterclockwise direction in FIG. 8 to rotate it in the same direction against the torsion of the spring 96. When the arm 88 reaches the neutral position between the fifth speed position and the reverse speed position, the projection 95a abuts an end 92b in the opening 92a (FIG. 9), so that the cam is stopped rotating. Accordingly, the rotation of the arm 88 to the reverse position R (FIG. 10c) is checked, so that the misshifting of the shift lever to the reverse position can be prevented.

When the shift lever 70 is shifted to the middle position a, the arm 88 disengages from the edge 95e of the cam 95, resulting in returning the cam to the original position (FIG. 10a). When the shift lever 70 is shifted to the reverse position R, the arm 88 moves within the groove 93a as shown in FIG. 10c.

From the foregoing, it will be understood that the shifting of the shift lever from the fifth position to the reverse position is checked by the cam 95. Since elements of the reverse check mechanism are provided in an independent holder, work of attaching the mechanism can be easily done.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A reverse check mechanism for a transmission in which a reverse gear position and one of change-speed gear positions for a gear shift lever are positioned on opposite sides of neutral position, comprising:
   an arm operatively connected to the shift lever;
   a cylindrical holder secured to a case of the transmission;
   a slidable shaft slidably provided in the holder;
   a cam slidably and rotatably mounted on an end portion of the slidable shaft;
   the slidable shaft and cam having engaging portions which engage with an end of the arm when the shift lever is shifted to the neutral position between both gear positions, so that the shaft and cam are moved to the neutral position;
   the cam having a recess having an edge adapted to engage with an end of the arm and a projection at an end of the cam;
   a spring retainer secured to the holder;
   a first spring provided between the slidable shaft and the spring retainer for urging the shaft in an axial direction;
   a second spring provided between the cam and the spring retainer for urging the cam in the same direction as the first spring and in a circumferential direction;
   the spring retainer forming an opening in which said projection of the cam is engaged;
   stopping means for stopping the cam from rotating to the reverse gear position from the neutral position, the stopping means comprising said projection and said opening;
   the recess of the cam being so arranged that when the shift lever is shifted to the change-speed gear position, an end portion of the arm corresponds to the recess, so that the cam is axially moved by the second spring so as to engage the edge of the recess with the end portion of the arm, whereby the movement of the arm from the neutral position to the reverse gear position is prevented by the checking of the cam caused by the stopping means.

2. The reverse check mechanism according to claim 1 wherein the change-speed gear position is a fifth gear position.

3. The reverse check mechanism according to claim 1 wherein the axis of the holder is at a right angle with the shifting direction of the shift lever for engaging gears.

4. The reverse check mechanism according to claim 1 further comprising a spring loaded ball lock mechanism for positioning the slidable shaft.

5. A reverse check mechanism for a transmission in which a reverse gear position and one of change-speed gear positions for a gear shift lever are positioned on opposite sides of the neutral position, comprising:
   an arm operatively connected to the shift lever;
   a cylindrical holder secured to a case of the transmission;
   a slidable shaft slidably provided in the holder;
   a cam slidably and rotatably mounted on an end portion of the slidable shaft;
   the slidable shaft and cam having engaging sides which engage with an end of the arm;
   the cam having a recess having an edge adapted to engage with an end of the arm and a projection at the axial end of the cam opposite to said engaging side;
   a spring retainer secured to the holder;
   a first spring provided between the slidable shaft and the spring retainer for urging the shaft to the end of the arm;
   a second spring provided between the cam and the spring retainer for urging the cam to the end of the arm and in a circumferential direction;
   the spring retainer having an arcuate opening in which said projection of the cam is slidably engaged;
   the arcuate opening having an end with which said projection engages so as to stop the cam from rotating to the reverse gear position from the neutral position;
   the recess of the cam being so arranged that when the shift lever is shifted to the change-speed gear position, an end portion of the arm corresponds to the recess, so that the cam is axially moved by the second spring so as to engage the edge of the recess with the end portion of the arm, whereby the movement of the arm from the neutral position to the reverse gear position is prevented by the checking of the cam caused by the engagement of the projection with the end of the arcuate opening.

6. A reverse check mechanism for a transmission in which a reverse gear position and one of change-speed gear positions for a gear shift lever are positioned on opposite sides of a neutral position, comprising:
   an arm operatively connected to the shift lever;
   a cylindrical holder secured to a case of the transmission;
   a slidable shaft slidably provided in the holder;
   a cam slidably and rotatably mounted on an end portion of the slidable shaft;
   the slidable shaft and cam having engaging sides which engage with an end of the arm;
   the cam having a recess having an edge adapted to engage with an end of the arm and a projection at an end of the cam;
   a spring retainer secured to the holder;
   a first spring provided between the slidable shaft and the spring retainer for urging the shaft in an axial direction;
   a second spring provided between the cam and the spring retainer for urging the cam in the same direction as the first spring and in a circumferential direction;

the spring retainer having an opening in which said projection of the cam is engaged;

stopping means for stopping the cam from rotating to the reverse gear position from the neutral position, the stopping means comprising said projection and said opening;

the recess of the cam being so arranged that when the shift lever is shifted to the change-speed gear position, an end portion of the arm corresponds to the recess, so that the cam is axially moved by the second spring so as to engage the edge of the recess with the end portion of the arm, whereby the movement of the arm from the neutral position to the reverse gear position is prevented by the checking of the cam caused by the stopping means.

* * * * *